United States Patent
Caldwell et al.

(10) Patent No.: US 8,879,901 B2
(45) Date of Patent: Nov. 4, 2014

(54) OPTICAL ATTACHMENT FOR REDUCING THE FOCAL LENGTH OF AN OBJECTIVE LENS

(75) Inventors: J. Brian Caldwell, Petersburg, VA (US); Wilfried Bittner, Tsuen Wan (HK)

(73) Assignee: Caldwell Photographic, Inc., Petersburg, VA (US)

( * ) Notice: Subject to any disclaimer, the term of this patent is extended or adjusted under 35 U.S.C. 154(b) by 153 days.

(21) Appl. No.: 13/589,880

(22) Filed: Aug. 20, 2012

(65) Prior Publication Data

US 2013/0064532 A1    Mar. 14, 2013

Related U.S. Application Data

(60) Provisional application No. 61/573,847, filed on Sep. 13, 2011.

(51) Int. Cl.
  *G03B 17/00* (2006.01)
  *G02B 9/34* (2006.01)
  *G02B 15/177* (2006.01)
  *G02B 13/18* (2006.01)

(52) U.S. Cl.
  CPC .............. *G02B 15/177* (2013.01); *G02B 13/18* (2013.01)
  USPC .............................................. 396/71; 359/781

(58) Field of Classification Search
  CPC ........ G03B 17/14; G03B 17/12; G03B 17/56; G03B 9/34; G03B 3/18; G03B 15/177; G03B 15/1902; H04N 5/23209; H04N 5/2257
  USPC .............................................. 396/71; 359/781
  See application file for complete search history.

(56) References Cited

U.S. PATENT DOCUMENTS

| | | | |
|---|---|---|---|
| 2,186,605 A | 1/1940 | Herzberger |
| 4,264,151 A | 4/1981 | Okano |
| 4,634,235 A | 1/1987 | Fujioka |
| 4,830,474 A | 5/1989 | Nakayama et al. |
| 5,499,069 A | 3/1996 | Griffith |
| 6,373,638 B1 | 4/2002 | Kohno |

*Primary Examiner* — Rochelle-Ann J Blackman
(74) *Attorney, Agent, or Firm* — Opticus IP Law PLLC

(57) ABSTRACT

An optical attachment configured to be operably attached to the image side of an objective lens to reduce the focal length and focal ratio of the objective lens. The focal-reducing attachment includes four lens elements and has a magnification of between 0.5 and 1. The focal-reducing lens can work with objective lenses having relatively large working distances for a large format size as well as with cameras having a smaller format size and relatively small permissible working distance.

17 Claims, 7 Drawing Sheets

OPTICAL ATTACHMENT FOR REDUCING THE FOCAL LENGTH OF AN OBJECTIVE LENS

CLAIM OF PRIORITY

This application claims the benefit of priority under 35 U.S.C. §119(e) of U.S. Provisional Application Ser. No. 61/573,847, filed on Sep. 13, 2011, which application is incorporated by reference herein.

FIELD

The present disclosure is directed to an optical attachment placed on the image side of an objective lens in order to reduce the focal length and focal ratio of that objective lens. The present invention is particularly suitable for adapting objective lenses designed with a relatively large working distance for a large format size to cameras having a smaller format size and relatively small permissible working distance.

BACKGROUND ART

Lenses designed for 35 mm single lens reflex cameras ("SLR lenses") are well known in the art, and millions of such lenses have been manufactured since the late 1950's. An important feature of these lenses is that they must have a working distance that is sufficiently large to allow a reflex mirror to swing into the optical path in order to direct the image to a viewfinder system.

Optical attachments for increasing the focal length of SLR lenses are also well known, and are commonly called "teleconverters." Teleconverters are an optical construction with negative optical power which is placed on the image side of an objective lens in order to increase the focal length of the objective lens. Teleconverters are almost always designed to maintain a sufficient working distance to be used with single lens reflex cameras. Unfortunately, teleconverters have several undesirable side effects, including: 1) they increase the focal ratio of the objective lens, thus reducing the "speed" of the objective plus teleconverter system; and 2) they magnify the aberrations of the objective lens, thus reducing the optical performance of the system.

Optical attachments for decreasing the focal length of an objective lens are also known in the art. These include: 1) afocal attachments placed on the object side of an objective; 2) re-imaging systems placed behind the image plane of an objective lens; and 3) a positive powered lens group placed between the objective and the image. The present disclosure is of the third type. Focal reducers of this type have several potential advantages, including 1) the aperture ratio is reduced; 2) the field of view of the objective lens can be largely maintained when used on a smaller format; 3) the vertex length of the objective-attachment system can be smaller than that of the objective lens alone; 4) the size and weight of a rear attachment can be much less than that of an afocal front attachment; 5) the chief ray angle of the objective-attachment system can be significantly reduced compared to that of the objective alone; and 6) the aberrations of the objective lens can be de-magnified, thus increasing resolution and contrast of the final image.

Despite these potential advantages, rear attachments for reducing the focal length of photographic objectives are notably uncommon due to a number of design and implementation challenges. Chief among these challenges is the fact that rear focal reducers of fairly simple construction tend to reduce the working distance of the system to a remarkable degree, thus making them unsuitable for use with single lens reflex cameras. An elaborate reverse-telephoto construction for eliminating this defect is disclosed in U.S. Pat. No. 5,499,069, but this solution is very complex and is not suitable for large apertures (e.g., small aperture ratios).

Another problem with rear focal reducers is that they inherently suffer from large undercorrected field curvature. This is dramatically shown by the focal reducers disclosed in U.S. Pat. Nos. 2,186,605 and 4,264,151. The focal reducers disclosed in U.S. Pat. No. 4,264,151 also suffer from a very large amount of barrel distortion. More recent examples, such as those disclosed in U.S. Pat. Nos. 4,634,235, 4,830,474 and 6,373,638 are reasonably well corrected for field curvature, but they suffer from large amounts of spherical aberration when used at a large aperture.

Recent advances in electronic viewfinders have resulted in a new type of interchangeable lens camera that has no need for a reflex mirror. Such cameras are commonly called "mirrorless cameras", and they typically have a very short lens flange to image plane distance compared with SLR cameras with a similar image size. Examples of mirrorless cameras include the Micro Four Thirds cameras manufactured by Olympus and Panasonic, the Sony NEX series cameras, and the Samsung NX series cameras. The flange distance—the distance from the lens flange to the image plane—in all of these cameras is relatively small.

In Micro Four Thirds cameras the flange distance is approximately 20 mm, and in Sony Nex cameras the flange distance is approximately 18 mm. By contrast, the flange distance in 35 mm SLR cameras with a Nikon F mount is 46.5 mm. The large difference between the flange distance of 35 mm SLR cameras and mirrorless cameras allows for the design and implementation of a wide range of adapters to mount 35 mm SLR lenses onto mirrorless cameras. However, none of the adapters developed to-date reduce the focal length of the attached 35 mm SLR lens.

Thus, there is a need for optical attachment for reducing the focal length of an objective lens wherein said optical attachment in combination with said objective lens has a very high image quality at large aperture over a large field of view. There is additionally a need for such an adaptor to be as compact as possible, to be readily manufacturable, and to allow a wide variety of SLR lenses to be adpated to various mirrorless cameras.

SUMMARY

The present disclosure is directed to an optical attachment placed on the image side of an objective lens in order to reduce the focal length and focal ratio of that objective lens. The present disclosure is particularly suitable for adapting objective lenses designed with a relatively large working distance for a large format size to cameras having a smaller format size and relatively small permissible working distance. Optical attachments designed according to the present disclosure will have very high image quality at large aperture over a large field of view. In particular, these attachements are simultaneously well-corrected for all major aberrations: spherical aberration, coma, field curvature, astigmatism, and distortion.

An aspect of the disclosure is a focal reducing attachment for use with an objective lens and having in order from an object side to an image side:

a first lens element having a first negative power and an object-side concave surface;

a second lens element having a first positive power and an object-side surface having a curvature CvOb2;

a third lens element having a second negative power greater than the first negative power and having an image-side surface having a curvature CvIm3;

a fourth lens element having a second positive power and an image-side surface; and wherein the focal reducing attachment has an overall power φ such that (CvOb2+CvIm3)/φ>3 and an overall magnification M such that 0.5≤M≤1.

Another aspect of the disclosure is the focal reducing attachment as described above, in which the combined focal reducing attachment and objective lens defines an f-number of 0.68 or greater.

Another aspect of the disclosure is the focal reducing attachment as described above, further comprising either undercorrected or overcorrected spherical aberration up to two waves.

Another aspect of the disclosure is the focal reducing attachment as described above, wherein the magnification M satisfies 0.65≤M≤0.85.

Another aspect of the disclosure is the focal reducing attachment as described above, where the fourth lens element has an image-side surface that is either plano or convex.

Another aspect of the disclosure is the focal reducing attachment as described above, wherein VT is a vertex distance from the object-side surface of the first lens element to the image-side surface of the fourth lens element, and wherein 0.05≤VT·φ<0.4, or in an alternative example, is 0.1≤VT·φ<0.25

Another aspect of the disclosure is the focal reducing attachment as described above, in which objective lens has a first vertex length, the combination of the focal reducing attachment and the objective lens defines a second vertex length, and wherein the second vertex length is shorter than the first vertex length.

Another aspect of the disclosure is the focal reducing attachment as described above, wherein the objective lens is configured as a 35 mm single-lens-reflex (SLR) lens, the focal reducing attachment further including an object side that mounts to the 35 mm SLR lens and also includes an image side that mounts to a mirrorless camera.

Another aspect of the disclosure is the focal reducing attachment as described above, wherein the mirrorless camera is selected from the group of mirrorless cameras consisting of: a Sony NEX series camera, a Micro Four Thirds camera, and a Fujifilm X series camera.

Another aspect of the disclosure is the focal reducing attachment as described above, wherein the object side is configured to mount either a Nikon F mount or a Canon EF mount.

Another aspect of the disclosure is the focal reducing attachment as described above, further including a manual adjustment having a means for manually adjusting the iris diaphragm of a Nikon F mount lens, including "G" type Nikon F mount lenses lacking an aperture ring.

Another aspect of the disclosure is a camera system that includes the focal reducing attachment as described above, a mirrorless camera having a camera body; and wherein the focal reducing lens is disposed between the objective lens and the camera body.

DETAILED DESCRIPTION

The present disclosure is directed to an optical attachment placed on the image side of an objective lens in order to reduce the focal length and focal ratio of that objective lens. The present disclosure is particularly suitable for adapting objective lenses designed with a relatively large working distance for a large format size to cameras having a smaller format size and relatively small permissible working distance.

The terms "focal reducer", "focal reducer lens" and "focal reducing attachment" are used synonymously herein.

Figure 1:
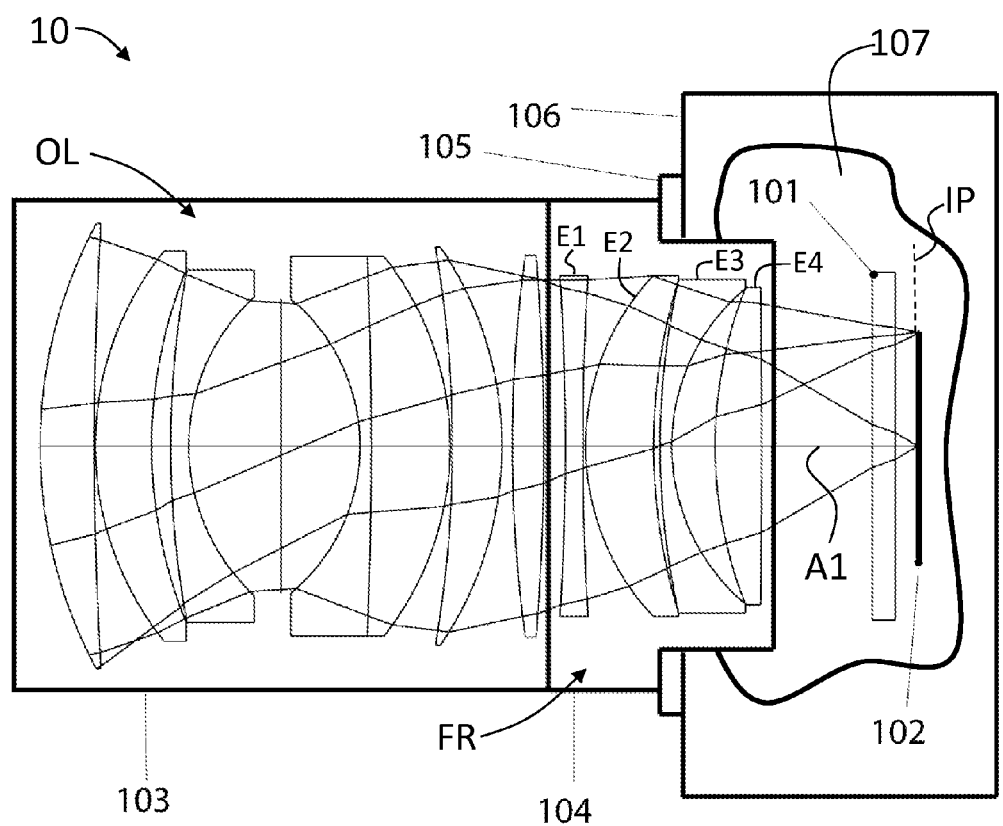
FIG. 1 is a schematic diagram of an example embodiment of a camera system that includes a camera, an objective lens and a focal reducer lens disposed between the objective lens and the camera so that the focal length of the system is reduced.

FIG. 1 is a schematic diagram of an example embodiment of a camera system 10 that includes a camera body 106, an objective lens OL, and a focal reducer lens FR operably disposed between the master (objective) lens and the camera so that the combined focal length is less than that of the objective lens. The combined objective lens OL and focal reducer FR is mounted to a mounting flange 105 of camera body 106 and has an axis A1. Camera body 106 has an interior 107 that contains an image sensor 102 arranged at an image plane IP and a filter pack 101 arranged along axis A1 and mounted within the camera body interior. Image sensor 102 defines the image side of the combined lens system of objective lens OL and focal reducer FR.

Although mirrorless cameras typically have a relatively short permissible working distance, this distance is still on the order of 10 mm or more due to various filters and other mechanical obstructions placed in front of the sensor. FIG. 1 schematically illustrates mechanical mounts 103 and 104 for the objective lens OL and the focal reducer FR, respectively.

Focal reducer FR generally includes four powered optical elements E1 through E4 arranged in the following order from an object side arranged along its axis A1 (and using the reference numbers from FIG. 2): 1) a weak negative-powered lens element E1; 2) a strong positive-powered lens element E2; 3) a strong negative-powered lens element E3; and 4) a positive-powered lens element E4. In the discussion below, these four lens elements have select reference numbers in the various Examples of FIGS. 2, 6, 10, 14, 18 and 22. In an example, focal reducer FR consists of four optical elements E1 through E4.

In addition to the above-mentioned powered optical elements E1 through E4, focal reducers FR designed according to the present disclosure may also include one or more plane parallel plates 101. Such plates 101 will most often be encountered on the image side of element E4, and they are used to model the various coverglasses and filters that are built-in to most digital cameras.

The unusually high optical performance of focal reducing attachments designed according to the present disclosure is made possible by a combination of two important features. The first important feature is that the object-facing surface of element E2 and the image-facing surface of the element E3 are strongly curved toward the image plane, which reduces field curvature and astigmatism to very low levels. In the case of element E2 the object-facing surface is convex, and in the case of element E3 the image-facing surface is concave. In both cases the sign of the curvature will be positive, using normal optical sign convention. The strongly curved concave surface on the image-facing surface of element E3 additionally enables excellent correction of distortion. By comparison, the focal reducers disclosed in U.S. Pat. No. 4,264,151 lack this feature and as a result they suffer from unacceptable levels of field curvature, astigmatism, and distortion.

The second important feature is that the object-facing surface of the element E1 is concave toward the object, which reduces spherical aberration at very large apertures and also helps to flatten the field near the extreme corners of the image. By comparison, the focal reducers disclosed in U.S. Pat. No. 6,373,638 lack this feature, and as a result they are unsuitable for large aperture applications.

It is useful to define a quantity Q1 in connection with focal reducing attachments designed according to the present disclosure:

$$Q1 = (CvOb2 + CvIm3)/\text{Phi},$$

where CvOb2 is the curvature of the object-facing surface of lens element 2; CvIm3 is the curvature of the image-facing surface of lens element 3; and Phi is the optical power of the focal reducing attachment. In order to correct field curvature and astigmatism to acceptable levels it is necessary to ensure that the quantity Q1 has a value greater than three, and preferably a value greater than six. A practical upper limit for Q1 is 30. If Q1>30, then the permissible maximum aperture and/or maximum image diagonal becomes very small, or else the surface curvatures become so great that they approach a hyperhemispheric condition.

It is also useful to define a quantity Q2 in connection with focal reducing attachments designed according to the present disclosure:

$$Q2 = VT*\phi$$

where VT is the thickness from the first to last vertex of the focal reducer, not counting any plane-parallel elements in the front or rear of the attachment, and $\phi$ is the optical power of the attachment, wherein $\phi = 1/FL$, where FL is the overall focal length of the focal reducer FR. In order for the focal reducing attachment to be usable with a wide variety of objective lenses and cameras, in an example the quantity Q2 should have a value less than 0.4, and preferably a value less than 0.25. Also in an example, the quantity Q2 should have a value greater than 0.05 in order to provide a reasonably large aperture and image diagonal while still maintaining adequate aberration correction.

Elements E2 and E3 may either be air-spaced or else they may be cemented together. In general, designs in which Elements E2 and E3 are air-spaced tend to offer better correction of high order coma, which harms performance near the corners of the field. However, it is possible to substantially reduce this high order coma by incorporating one or more aspheric surfaces into the design. Preferred surfaces for inclusion of an asphere include the object-facing surface of element E2 and the image-facing surface of element E4. If elements E2 and E3 are air-spaced, then it is also feasible to incorporate an asphere on the image-facing surface of element E2 or the object-facing surface of element E3. Unfortunately, aspherical surfaces are expensive to produce, particularly in modest production volumes, so all-spherical designs are highly desirable.

Focal reducing attachments designed according to the present disclosure may be well-corrected at extremely large apertures ranging down to about f/0.7. Compatibility with larger apertures will generally require larger clear apertures of both surfaces of all four Elements, especially the clear apertures of E1. Care must be taken in designing a practical attachment in order to avoid mechanical interference between element E1 and any mechanical protrusions of the attached objective lens. If the focal reducing attachment is intended for general-purpose use with a large variety of objective lenses then it may be necessary to limit the maximum aperture to about f/0.90 even if it is theoretically possible to correct aberrations at a significantly larger aperture.

In order to achieve an extremely large aperture for the system comprising an objective lens plus attached focal reducer it is necessary to use a very fast objective lens to begin with. For example if the objective lens has an aperture of f/1.26 and the focal reducer has a magnification of 0.71×, then the maximum aperture of the combined system will be f/0.90. In order to reach a system aperture of f/0.71 with a 0.71× reducer it is necessary to use an objective lens having an aperture of f/1.0. Since there are very few SLR objective lenses with a maximum aperture of f/1.0, but a large number of SLR objective lenses with a maximum aperture of f/1.26 it is reasonable to limit the maximum output aperture of the focal reducer to f/0.90 except for special applications.

Detailed data for six different example embodiments are provided below. Tables 1a, 2a, 3a, 4a, 5a and 6a provide prescription data for Examples 1-6, respectively. Tables 1b, 2b, 3b, 4b, 5b and 6b provide specification data for Examples 1-6, respectively. Two of the examples (Example 5 and Example 6) incorporate aspherical surfaces which are expressed by the following equation:

$$Z = r^2/(R(1+\text{SQRT}(1-(1+k)r^2/R^2))) + C4r^4 + C6r^6 + C8r^8 + C10r^{10}$$

where Z is the displacement in the direction of the optical axis measured from the polar tangent plane, r is the radial coordinate, R is the base radius of curvature, k is the conic constant, and $C_i$ is the i-th order aspherical deformation constant. Tables 5c, and 6c provide aspheric surface data for examples 5 and 6, respectively. A listing of refractive index ($n_d$) and dispersion (Abbe number, or $v_d$) for all of the glass types used in the Examples is provided in Table 7.

Example 1

Figure 2:
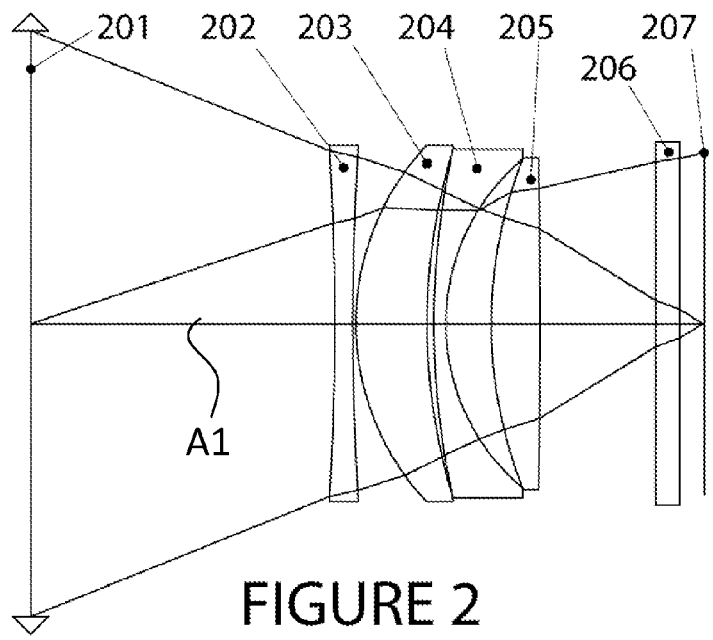
FIG. 2 is a schematic diagram illustrating the layout of Example #1.

FIG. 2 is a layout of Example 1 of the present disclosure, which is a focal reducing attachment having a focal length of 83.1 mm and a magnification of 0.71×. In order to evaluate optical performance, a paraxial lens 201 having a focal length of 60 mm is placed 25 mm toward the object side of the optical attachment. Although the aperture stop for the attachment is coincident with the paraxial lens for the purpose of aberration evaluation, it may be moved axially over a wide range of values so that it will correspond with the exit pupil location of an attached objective lens. In practice, the attached objective lens will normally determine the actual location of the aperture stop and system exit pupil since it will generally have an iris mechanism. Example 1 is designed to be compatible with a wide range of objective lens exit pupil distances.

The focal reducing attachment itself comprises four optical elements in order from the object side to the image side: 1) a weak negative element 202 with a concave object-facing surface; 2) a strong positive meniscus element 203; 3) a strong negative meniscus element 204; and 4) a biconvex positive element 205. The plane-parallel plate 206 is a model for the filter stack in the camera comprising a coverglass, an anti-aliasing filter, and an IR absorbing filter. The image plane 207 is located approximately 55.4 mm from the 60 mm paraxial lens, which means that the system comprising the objective lens plus the attachment has a vertex length that is 4.6 mm shorter than the objective lens alone. Both 203 and 205 are made from high index crown glasses in order to minimize aberrations and to keep the system as compact as possible. Element 204 is made from a highly dispersive flint glass in order to correct chromatic aberrations.

Figure 3:
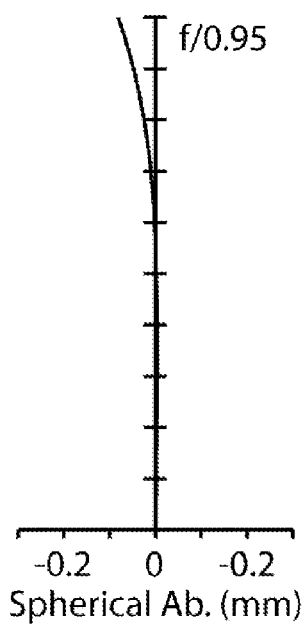
FIG. 3 is a plot of longitudinal spherical aberration in millimeters for Example #1.
Figure 4:
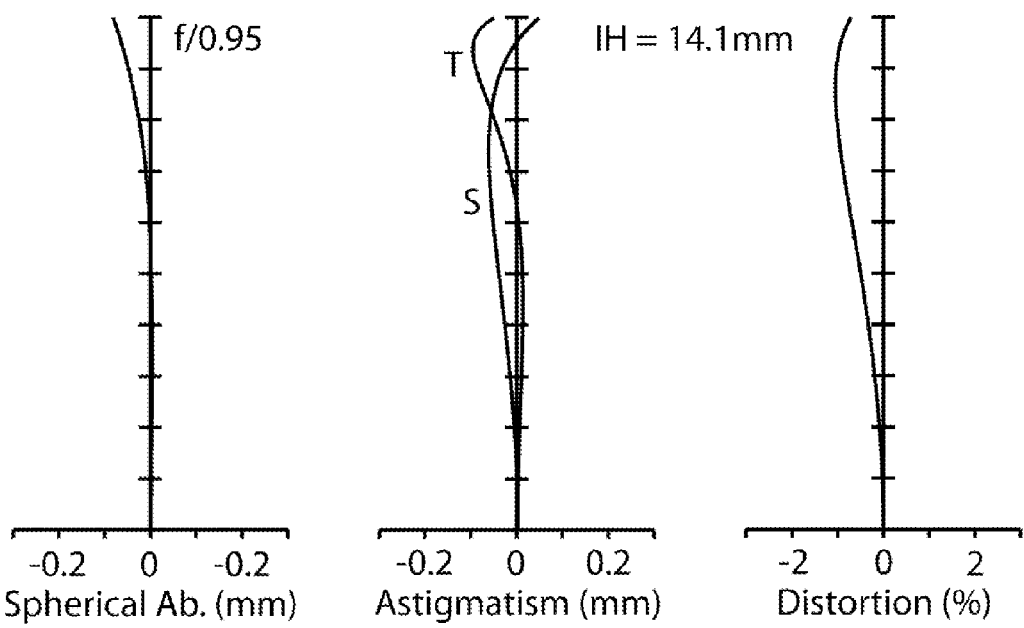
FIG. 4 is a plot of longitudinal astigmatism in millimeters for Example #1.
Figure 5:
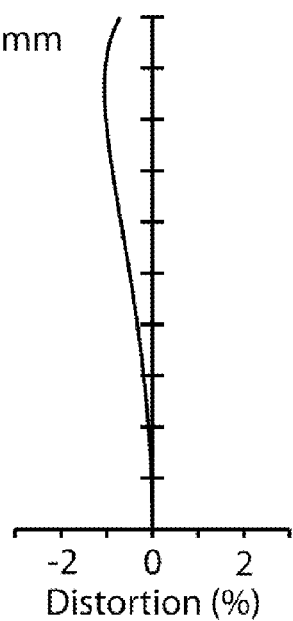
FIG. 5 is a plot of distortion in percent for Example #1.

FIG. 3 is a plot of longitudinal spherical aberration as a function of pupil coordinate for Example 1. This plot indicates a high degree of on-axis correction at an extremely large aperture of f/0.95. There is a small amount of undercorrected spherical aberration, but this is intentional as it serves to soften the edges of defocused background highlights in the image. By slightly modifying the attachment design the spherical aberation can be corrected almost completely if desired, or it can be made slightly overcorrected in order to soften the edges of defocused foreground highlights. FIG. 4 is a plot of longitudinal astigmatism as a function of image height, and it indicates that Example 1 has a very flat image field. FIG. 5 is a plot of distortion as a function of image height, and it indicates excellent distortion correction.

Example 1 has a magnification of 0.71×, which means that it reduces the focal length by a factor of 0.71 and it also reduces aperture ratio of the objective lens by one full stop. For example, if the attachment is placed behind a 50 mm f/1.4 objective the resulting system has a focal length of 35 mm and an aperture of f/1.0. The image circle of the objective lens is also reduced by a factor of 0.71, which means that in order to take full advantage of the 28.2 mm diameter image circle capacity of Example 1 the objective lens must have an image circle diameter of at least 28.2/0.71=39.72 mm. Since most 35 mm SLR lenses covering a standard 24×36 mm format have an image circle diameter of at least 43.27 mm this means that there will be a very large number of suitable objective lenses to choose from.

Detailed prescription data for Example 1 is given in Table 1a below. Specification data for Example 1 is given in Table 1b below.

TABLE 1a

Prescription Data for Example 1

| SURF# | TYPE | R | T | GLASS | DIA |
|---|---|---|---|---|---|
| OBJ | | INF | INF | | |
| STO | PAR | INF | 25.000 | | |
| 2 | SPH | −235.88 | 1.500 | S-TIL1 | 29.400 |
| 3 | SPH | 235.88 | 0.250 | | 29.400 |
| 4 | SPH | 21.532 | 5.850 | S-LAH55 | 29.400 |
| 5 | SPH | 49.358 | 0.555 | | 28.800 |
| 6 | SPH | 65.908 | 1.000 | S-TIH1 | 28.800 |
| 7 | SPH | 17.803 | 3.737 | | 27.219 |
| 8 | SPH | 37.069 | 4.000 | S-LAL18 | 27.400 |
| 9 | SPH | −889.95 | 9.500 | | 27.400 |
| 10 | FLT | INF | 2.000 | S-NSL36 | 30.000 |
| 11 | FLT | INF | 2.000 | | 30.000 |
| IMG | FLT | INF | | | 28.200 |

TABLE 1b

Specification Data for Example 1
EXAMPLE 1 - SPECIFICATIONS

| Focal Length | 83.1 mm |
|---|---|
| Magnification | 0.71x |
| Aperture Ratio | f/0.95 |
| Image Diagonal | 28.2 mm |
| CvOb2 | 0.04644 |
| CvIm3 | 0.05617 |
| Q1 | 8.53 |
| VT | 16.89 |
| Q2 | 0.20 |

Example 2

Figure 6:
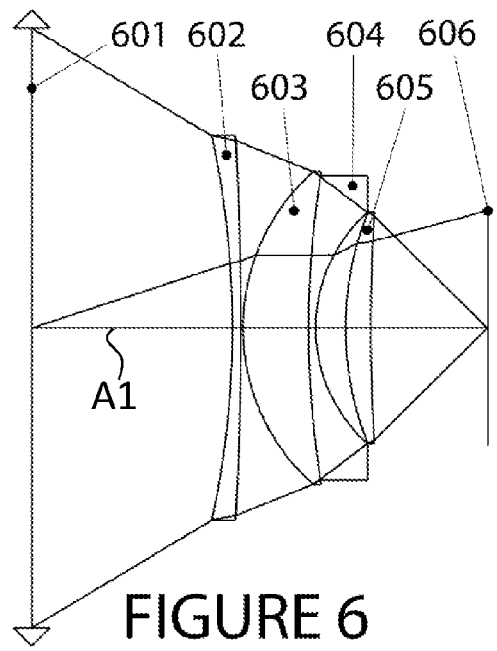
FIG. 6 is a schematic diagram illustrating the layout of Example #2.

FIG. 6 is a layout of Example 2 of the present disclosure, which is a focal reducing attachment having a focal length of 102.6 mm and a magnification of 0.71×. In order to evaluate optical performance, a paraxial lens 601 having a focal length of 60 mm is placed 24 mm toward the object side of the optical attachment. As with Example 1, the aperture stop for the attachment is coincident with the paraxial lens for the purpose of aberration evaluation, but it may be moved axially over a wide range of values so that it will correspond with the exit pupil location of an attached objective lens. In practice, the attached objective lens will normally determine the actual location of the aperture stop and system exit pupil since it will generally have an iris mechanism. Example 2 is designed to be compatible with a wide range of objective lens exit pupil distances.

The focal reducing attachment itself comprises four optical elements in order from the object side to the image side: 1) a weak negative element 602 with a concave object-facing surface; 2) a strong positive meniscus element 603; 3) a strong negative meniscus element 604; and 4) a meniscus positive element 605. The image plane 606 is located approximately 54.5 mm from the 60 mm paraxial lens, which means that the system comprising the objective lens plus the attachment has a vertex length that is 5.5 mm shorter than the objective lens alone. Both 603 and 605 are made from high index crown glasses in order to minimize aberrations and to keep the system as compact as possible. Element 604 is made from a highly dispersive flint glass in order to correct chromatic aberrations.

Figure 7:
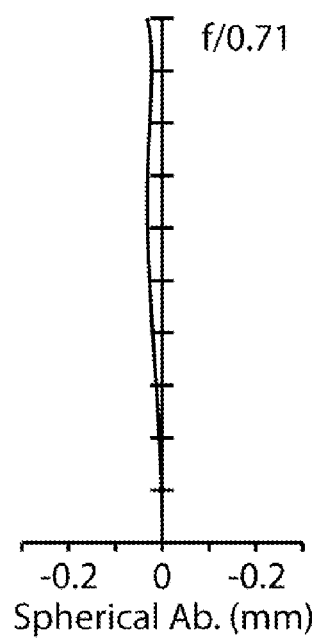
FIG. 7 is a plot of longitudinal spherical aberration in millimeters for Example #2.
Figure 8:
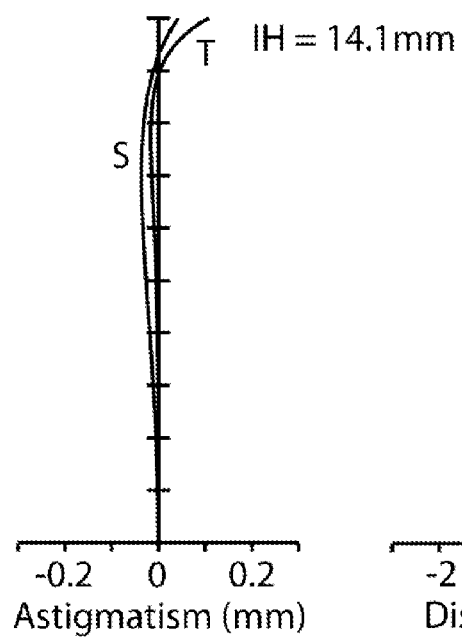
FIG. 8 is a plot of longitudinal astigmatism in millimeters for Example #2.
Figure 9:
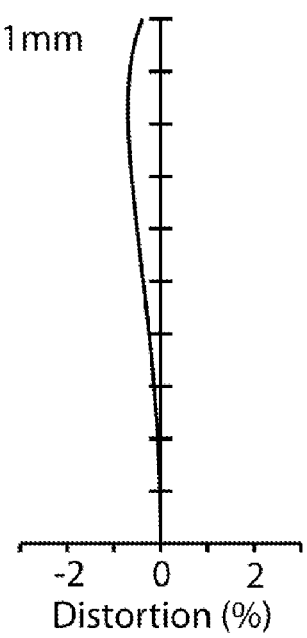
FIG. 9 is a plot of distortion in percent for Example #2.

FIG. 7 is a plot of longitudinal spherical aberration as a function of pupil coordinate for Example 2. This plot indicates a high degree of on-axis correction at an extremely large aperture of f/0.71. FIG. 8 is a plot of longitudinal astigmatism as a function of image height, and it indicates that Example 2 has a very flat image field. FIG. 9 is a plot of distortion as a function of image height, and it indicates excellent distortion correction.

Example 2 has a magnification of 0.71×, which means that it reduces the focal length by a factor of 0.71 and it also reduces aperture ratio of the objective lens by one full stop. In this case the attachment is capable of accepting an f/1.0 input beam, so, for example, if the attachment is placed behind a 50 mm f/1.0 objective the resulting system has a focal length of 35 mm and an aperture of f/0.71. The image circle of the objective lens is also reduced by a factor of 0.71, which means that in order to take full advantage of the 28.2 mm diameter image circle capacity of Example 2 the objective lens must have an image circle diameter of at least 28.2/0.71=39.72 mm. Since most 35 mm SLR lenses covering a standard 24×36 mm format have an image circle diameter of at least 43.27 mm this means that there will be a very large number of suitable objective lenses to choose from.

Detailed prescription data for Example 2 is given in Table 2a below. Specification data for Example 2 is given in Table 2b below.

TABLE 2a

Prescription Data for Example 2

| SURF# | TYPE | R | T | GLASS | DIA |
|---|---|---|---|---|---|
| OBJ |  | INF | INF |  |  |
| STO | PAR | INF | 24.000 |  |  |
| 2 | SPH | −108.812 | 1.000 | S-LAL8 | 46.200 |
| 3 | SPH | −433.019 | 0.250 |  | 46.200 |
| 4 | SPH | 25.164 | 7.864 | S-LAH58 | 37.600 |
| 6 | SPH | 115.285 | 0.850 | S-TIH1 | 36.600 |
| 7 | SPH | 18.647 | 3.579 |  | 27.800 |
| 8 | SPH | 37.454 | 3.000 | S-LAL8 | 27.800 |
| 9 | SPH | 214.233 | 14.000 |  | 27.000 |
| IMG | FLT | INF |  |  | 28.200 |

TABLE 2b

Specification Data for Example 2
EXAMPLE 2 - SPECIFICATIONS

| Focal Length | 102.6 mm |
|---|---|
| Magnification | 0.71x |
| Aperture Ratio | f/0.71 |
| Image Diagonal | 28.2 mm |
| CvOb2 | 0.03974 |
| CvIm3 | 0.05363 |
| Q1 | 9.58 |
| VT | 16.54 |
| Q2 | 0.16 |

Example 3

Figure 10:
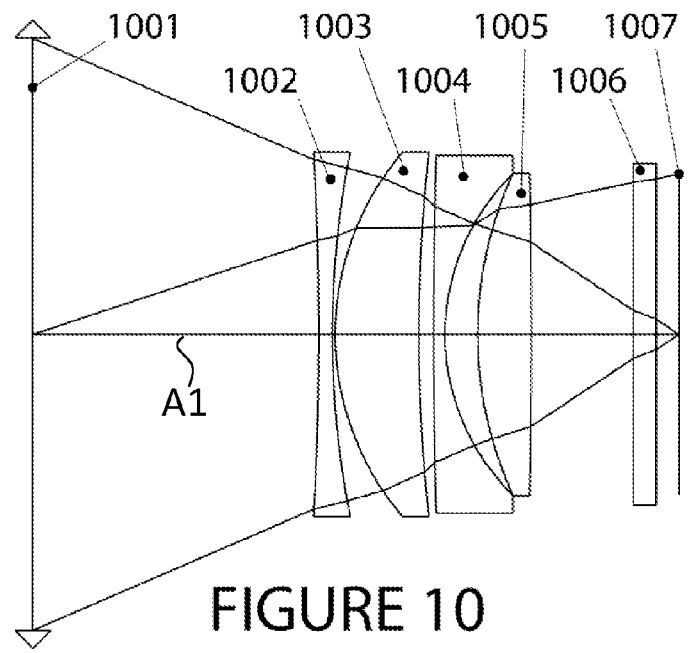
FIG. 10 is a schematic diagram illustrating the layout Example #3.

FIG. 10 is a layout of Example 3 of the present disclosure, which is a focal reducing attachment having a focal length of 84.6 mm and a magnification of 0.71×. In order to evaluate optical performance, a paraxial lens 1001 having a focal length of 60 mm is placed 25 mm toward the object side of the optical attachment. Although the aperture stop for the attachment is coincident with the paraxial lens for the purpose of aberration evaluation, it may be moved axially over a wide range of values so that it will correspond with the exit pupil location of an attached objective lens. In practice, the attached objective lens will normally determine the actual location of the aperture stop and system exit pupil since it will generally have an iris mechanism. Example 3 is designed to be compatible with a wide range of objective lens exit pupil distances.

The focal reducing attachment itself comprises four optical elements in order from the object side to the image side: 1) a weak negative element 1002 with a concave object-facing surface; 2) a strong positive meniscus element 1003; 3) a strong negative meniscus element 1004; and 4) a biconvex positive element 1005. The plane-parallel plate 1006 is a model for the filter stack in the camera comprising a coverglass, an anti-aliasing filter, and an IR absorbing filter. The image plane 1007 is located approximately 56.5 mm from the 60 mm paraxial lens, which means that the system comprising the objective lens plus the attachment has a vertex length that is 3.5 mm shorter than the objective lens alone. Both 1003 and 1005 are made from high index crown glasses in order to minimize aberrations and to keep the system as compact as possible. 1004 is made from a highly dispersive flint glass in order to correct chromatic aberrations.

Figures 11, 12, 13:
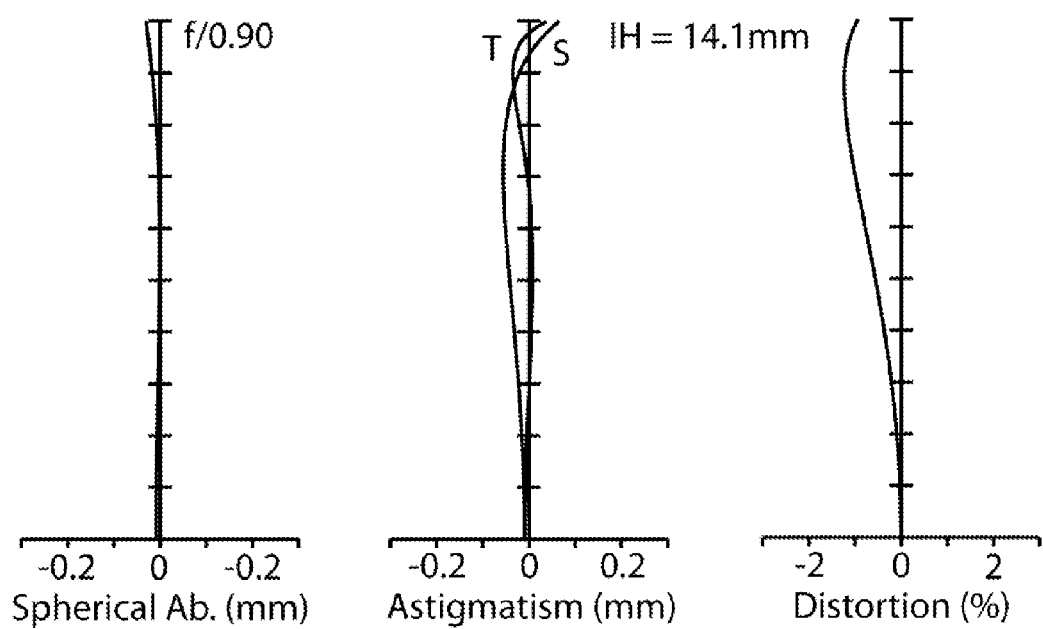
FIG. 11 is a plot of longitudinal spherical aberration in millimeters for Example #3.
FIG. 12 is a plot of longitudinal astigmatism in millimeters for Example #3.
FIG. 13 is a plot of distortion in percent for Example #3.

FIG. 11 is a plot of longitudinal spherical aberration as a function of pupil coordinate for Example 3. This plot indicates a high degree of on-axis correction at an extremely large aperture of f/0.90. FIG. 12 is a plot of longitudinal astigmatism as a function of image height, and it indicates that Example 3 has a very flat image field. FIG. 13 is a plot of distortion as a function of image height, and it indicates excellent distortion correction.

Example 3 has a magnification of 0.71×, which means that it reduces the focal length by a factor of 0.71 and it also reduces aperture ratio of the objective lens by one full stop. The image circle of the objective lens is also reduced by a factor of 0.71, which means that in order to take full advantage of the 28.2 mm diameter image circle capacity of Example 3 the objective lens must have an image circle diameter of at least 28.2/0.71=39.72 mm. Since most 35 mm SLR lenses covering a standard 24×36 mm format have an image circle diameter of at least 43.27 mm this means that there will be a very large number of suitable objective lenses to choose from.

Detailed prescription data for Example 3 is given in Table 3a below. Specification data for Example 3 is given in Table 3b below.

TABLE 3a

Prescription Data for Example 3

| SURF# | TYPE | R | T | GLASS | DIA |
|---|---|---|---|---|---|
| OBJ |  | INF | INF |  |  |
| STO | PAR | INF | 25.000 |  |  |
| 2 | SPH | −286.097 | 1.200 | S-NSL36 | 30.800 |
| 3 | SPH | 82.858 | 0.250 |  | 32.000 |
| 4 | SPH | 24.687 | 7.300 | S-LAH55 | 32.000 |
| 5 | SPH | 144.812 | 1.307 |  | 32.000 |
| 6 | SPH | 538.031 | 1.000 | S-TIH1 | 31.400 |
| 7 | SPH | 19.712 | 2.855 |  | 28.175 |
| 8 | SPH | 33.861 | 4.681 | S-LAH66 | 28.300 |
| 9 | SPH | −631.959 | 8.930 |  | 28.300 |
| 10 | FLT | INF | 2.000 | S-NSL36 | 30.000 |
| 11 | FLT | INF | 2.000 |  | 30.000 |
| IMG | FLT | INF |  |  | 28.200 |

TABLE 3b

Specification Data for Example 3
EXAMPLE 3 - SPECIFICATIONS

| | |
|---|---|
| Focal Length | 84.6 mm |
| Magnification | 0.71x |
| Aperture Ratio | f/0.90 |
| Image Diagonal | 28.2 mm |
| CvOb2 | 0.04051 |
| CvIm3 | 0.05073 |
| Q1 | 7.72 |
| VT | 18.59 |
| Q2 | 0.22 |

Example 4

Figure 14:
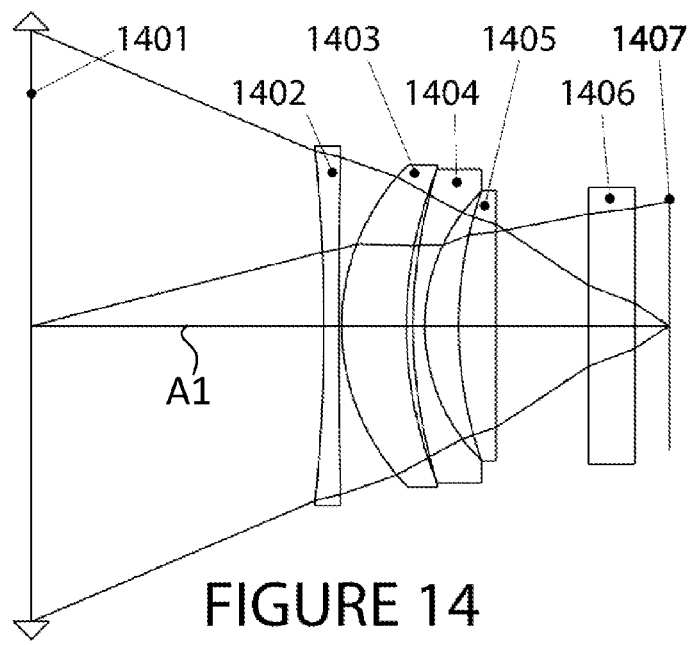
FIG. 14 is a schematic diagram illustrating the layout Example #4.

FIG. 14 is a layout of Example 4 of the present disclosure, which is a focal reducing attachment having a focal length of 90.6 mm and a magnification of 0.71x. In order to evaluate optical performance, a paraxial lens 1401 having a focal length of 70 mm is placed 35 mm toward the object side of the optical attachment. Although the aperture stop for the attachment is coincident with the paraxial lens for the purpose of aberration evaluation, it may be moved axially over a wide range of values so that it will correspond with the exit pupil location of an attached objective lens. In practice, the attached objective lens will normally determine the actual location of the aperture stop and system exit pupil since it will generally have an iris mechanism. Example 4 is designed to be compatible with a wide range of objective lens exit pupil distances.

The focal reducing attachment itself comprises four optical elements in order from the object side to the image side: 1) a weak negative element 1402 with a concave object-facing surface; 2) a strong positive meniscus element 1403; 3) a strong negative meniscus element 1404; and 4) a plano-convex positive element 1405. The plane-parallel plate 1406 is a model for the filter stack in the camera comprising a coverglass, an anti-aliasing filter, and an IR absorbing filter. The image plane 1407 is located approximately 65.2 mm from the 70 mm paraxial lens, which means that the system comprising the objective lens plus the attachment has a vertex length that is 4.8 mm shorter than the objective lens alone. Both 1403 and 1405 are made from high index crown glasses in order to minimize aberrations and to keep the system as compact as possible. Element 1404 is made from a highly dispersive flint glass in order to correct chromatic aberrations.

Figure 15:
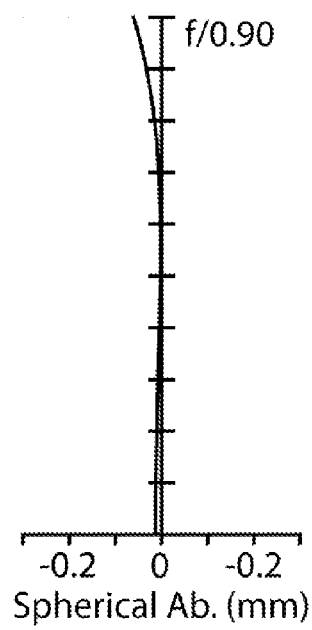
FIG. 15 is a plot of longitudinal spherical aberration in millimeters for Example #4.
Figure 16:
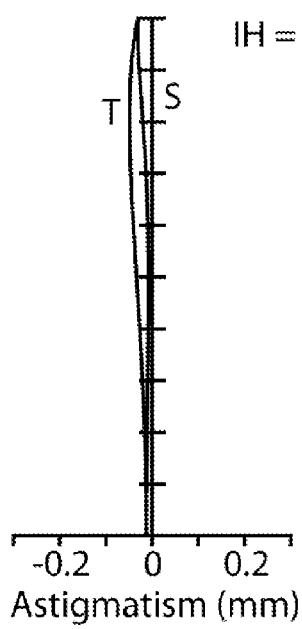
FIG. 16 is a plot of longitudinal astigmatism in millimeters for Example #4.
Figure 17:
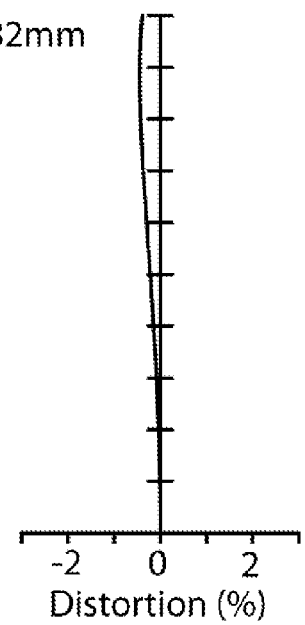
FIG. 17 is a plot of distortion in percent for Example #4.

FIG. 15 is a plot of longitudinal spherical aberration as a function of pupil coordinate for Example 4. This plot indicates a high degree of on-axis correction at an extremely large aperture of f/0.90. FIG. 16 is a plot of longitudinal astigmatism as a function of image height, and it indicates that Example 4 has a very flat image field. FIG. 17 is a plot of distortion as a function of image height, and it indicates excellent distortion correction.

Example 4 has a magnification of 0.71x, which means that it reduces the focal length by a factor of 0.71 and it also reduces aperture ratio of the objective lens by one full stop. The image circle of the objective lens is also reduced by a factor of 0.71, which means that in order to take full advantage of the 21.64 mm diameter image circle capacity of Example 4 the objective lens must have an image circle diameter of at least 21.64/0.71=30.48 mm.

Detailed prescription data for Example 4 is given in Table 4a below. Specification data for Example 4 is given in Table 4b below.

TABLE 4a

Prescription Data for Example 4

| SURF# | TYPE | R | T | GLASS | DIA |
|---|---|---|---|---|---|
| OBJ | | INF | INF | | |
| STO | PAR | INF | 35.000 | | |
| 2 | SPH | −157.246 | 1.300 | S-FSL5 | 31.200 |
| 3 | SPH | 740.474 | 0.250 | | 31.200 |
| 4 | SPH | 19.918 | 5.605 | S-LAH65 | 28.000 |
| 5 | SPH | 36.489 | 0.574 | | 27.259 |
| 6 | SPH | 45.975 | 1.000 | S-TIH1 | 27.259 |
| 7 | SPH | 16.396 | 2.951 | | 23.384 |
| 8 | SPH | 36.004 | 3.227 | S-LAL18 | 23.500 |
| 9 | SPH | INF | 8.000 | | 23.500 |
| 10 | FLT | INF | 4.000 | S-NSL36 | 24.000 |
| 11 | FLT | INF | 3.000 | | 24.000 |
| IMG | FLT | INF | | | 21.64 |

TABLE 4b

Specification Data for Example 4
EXAMPLE 4 - SPECIFICATIONS

| | |
|---|---|
| Focal Length | 90.6 mm |
| Magnification | 0.71x |
| Aperture Ratio | f/0.90 |
| Image Diagonal | 21.64 mm |
| CvOb2 | 0.05021 |
| CvIm3 | 0.06099 |
| Q1 | 10.08 |
| VT | 14.91 |
| Q2 | 0.16 |

Example 5

Figure 18:
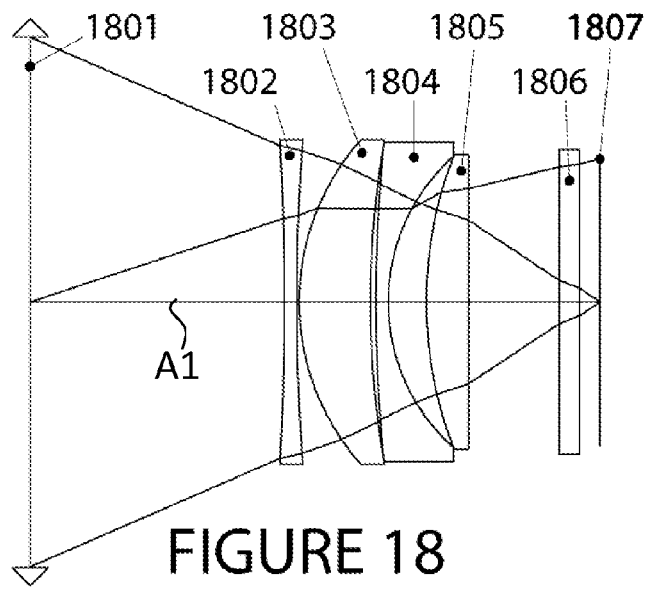
FIG. 18 is a schematic diagram illustrating the layout #5.

FIG. 18 is a layout of Example 1 of the present disclosure, which is a focal reducing attachment having a focal length of 83.1 mm and a magnification of 0.71x. In order to evaluate optical performance, a paraxial lens 1801 having a focal length of 70 mm is placed 35 mm toward the object side of the optical attachment. Although the aperture stop for the attachment is coincident with the paraxial lens for the purpose of aberration evaluation, it may be moved axially over a wide range of values so that it will correspond with the exit pupil location of an attached objective lens. In practice, the attached objective lens will determine the actual location of the aperture stop and system exit pupil since it will generally have an iris mechanism. Example 5 is designed to be compatible with a wide range of objective lens exit pupil distances.

The focal reducing attachment itself comprises four optical elements in order from the object side to the image side: 1) a weak negative element 1802 with a concave object-facing surface; 2) a strong positive meniscus element 1803; 3) a strong negative meniscus element 1804; and 4) a plano-convex positive element 1805. The plane-parallel plate 1806 is a model for the filter stack in the camera comprising a coverglass, an anti-aliasing filter, and an IR absorbing filter. The image plane 1807 is located approximately 66.0 mm from the 70 mm paraxial lens, which means that the system comprising the objective lens plus the attachment has a vertex length that is 4.0 mm shorter than the objective lens alone. Both 1803 and 1805 are made from high index crown glasses in order to minimize aberrations and to keep the system as compact as possible. Element 1804 is made from a highly dispersive flint glass in order to correct chromatic aberrations.

Example 5 incorporates an aspheric surface on the object side of E3. This aspheric surface is particularly useful in correcting high-order coma. Correcting high order coma has a side benefit of increasing the range of objective lens exit pupil distances for which the focal reducing attachment provides a high degree of optical correction.

Figure 19:
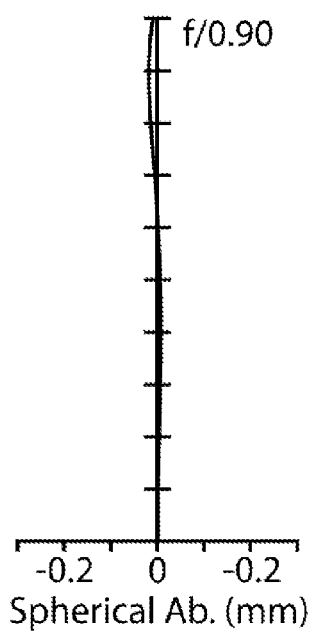
FIG. 19 is a plot of longitudinal spherical aberration in millimeters for Example #5.
Figures 20, 21:
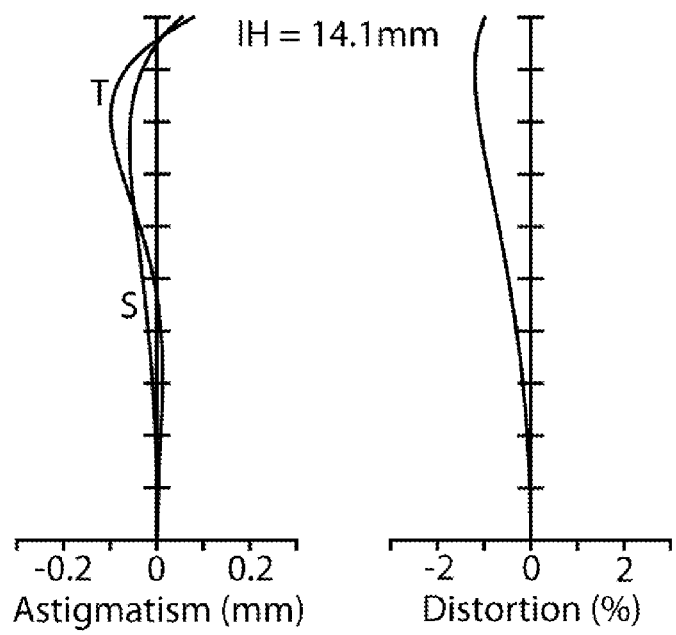
FIG. 20 is a plot of longitudinal astigmatism in millimeters for Example #5.
FIG. 21 is a plot of distortion in percent for Example #5.
Figure 22:
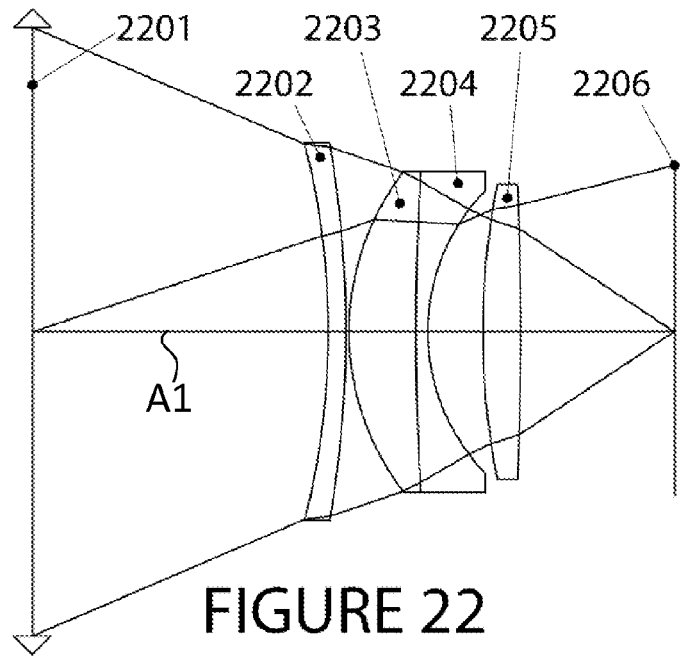
FIG. 22 is a schematic diagram illustrating the layout Example #6.

FIG. 19 is a plot of longitudinal spherical aberration as a function of pupil coordinate for Example 5. This plot indicates a high degree of on-axis correction at an extremely large aperture of f/0.90. FIG. 20 is a plot of longitudinal astigmatism as a function of image height, and it indicates that Example 5 has a very flat image field. FIG. 21 is a plot of distortion as a function of image height, and it indicates excellent distortion correction.

Example 5 has a magnification of 0.71×, which means that it reduces the focal length by a factor of 0.71 and it also reduces aperture ratio of the objective lens by one full stop. The image circle of the objective lens is also reduced by a factor of 0.71, which means that in order to take full advantage of the 28.2 mm diameter image circle capacity of Example 5 the objective lens must have an image circle diameter of at least 28.2/0.71=39.72 mm.

Detailed prescription data for Example 5 is given in Table 5a below. Specification data for Example 5 is given in Table 5b below. Asphere data is given in Table 5c below.

TABLE 5a

Prescription Data for Example 5

| SURF# | TYPE | R | T | GLASS | DIA |
|---|---|---|---|---|---|
| OBJ | | INF | INF | | |
| STO | PAR | INF | 35.000 | | |
| 2 | SPH | −288.913 | 1.200 | S-BAL14 | 30.900 |
| 3 | SPH | 211.959 | 0.250 | | 32.000 |
| 4 | SPH | 24.086 | 7.006 | S-LAH55 | 32.000 |
| 5 | SPH | 92.260 | 0.546 | | 31.487 |
| 6 | ASPH | 159.012 | 1.200 | S-TIH1 | 31.487 |
| 7 | SPH | 19.290 | 3.752 | | 28.731 |
| 8 | SPH | 40.056 | 4.131 | S-LAH66 | 29.000 |
| 9 | SPH | INF | 8.930 | | 29.000 |
| 10 | FLT | INF | 2.000 | S-NSL36 | 30.000 |
| 11 | FLT | INF | 2.000 | | 30.000 |
| IMG | FLT | INF | | | 28.200 |

TABLE 5b

Specification Data for Example 5
EXAMPLE 5 - SPECIFICATIONS

| Focal Length | 90.2 mm |
|---|---|
| Magnification | 0.71× |
| Aperture Ratio | f/0.90 |
| Image Diagonal | 28.2 mm |
| CvOb2 | 0.04152 |
| CvIm3 | 0.05184 |
| Q1 | 8.42 |
| VT | 18.09 |
| Q2 | 0.20 |

TABLE 5c

Aspheric Coefficients for Example 5
EXAMPLE 5 - ASPHERE DATA

| Surface # | 6 |
|---|---|
| R | 159.012 |
| k | 0.000 |
| C4 | 5.2653e−7 |
| C6 | 8.2099e−9 |
| C8 | −6.9376e−11 |
| C10 | 1.3902e−13 |

Example 6

FIG. 2 is a layout of Example 1 of the present disclosure, which is a focal reducing attachment having a focal length of 83.1 mm and a magnification of 0.71×. In order to evaluate optical performance, a paraxial lens 2201 having a focal length of 65 mm is placed 30 mm toward the object side of the optical attachment. Although the aperture stop for the attachment is coincident with the paraxial lens for the purpose of aberration evaluation, it may be moved axially over a wide range of values so that it will correspond with the exit pupil location of an attached objective lens. In practice, the attached objective lens will determine the actual location of the aperture stop and system exit pupil since it will generally have an iris mechanism. Example 6 is designed to be compatible with a wide range of objective lens exit pupil distances.

The focal reducing attachment itself comprises four optical elements in order from the object side to the image side: 1) a weak negative element 2202 with a concave object-facing surface; 2) a strong positive meniscus element 2203; 3) a strong negative meniscus element 2204; and 4) a biconvex positive element 2205. The image plane 2206 is located approximately 59.3 mm from the 65 mm paraxial lens, which means that the system comprising the objective lens plus the attachment has a vertex length that is 5.7 mm shorter than the objective lens alone. Both 2203 and 2205 are made from high index crown glasses in order to minimize aberrations and to keep the system as compact as possible. Element 2204 is made from a highly dispersive flint glass in order to correct chromatic aberrations.

Example 6 incorporates an aspheric surface on the object side of E2. This aspheric surface is particularly useful in correcting high-order coma. Correcting high order coma has a side benefit of increasing the range of objective lens exit pupil distances for which the focal reducing attachment provides a high degree of optical correction.

Figures 23, 24, 25:
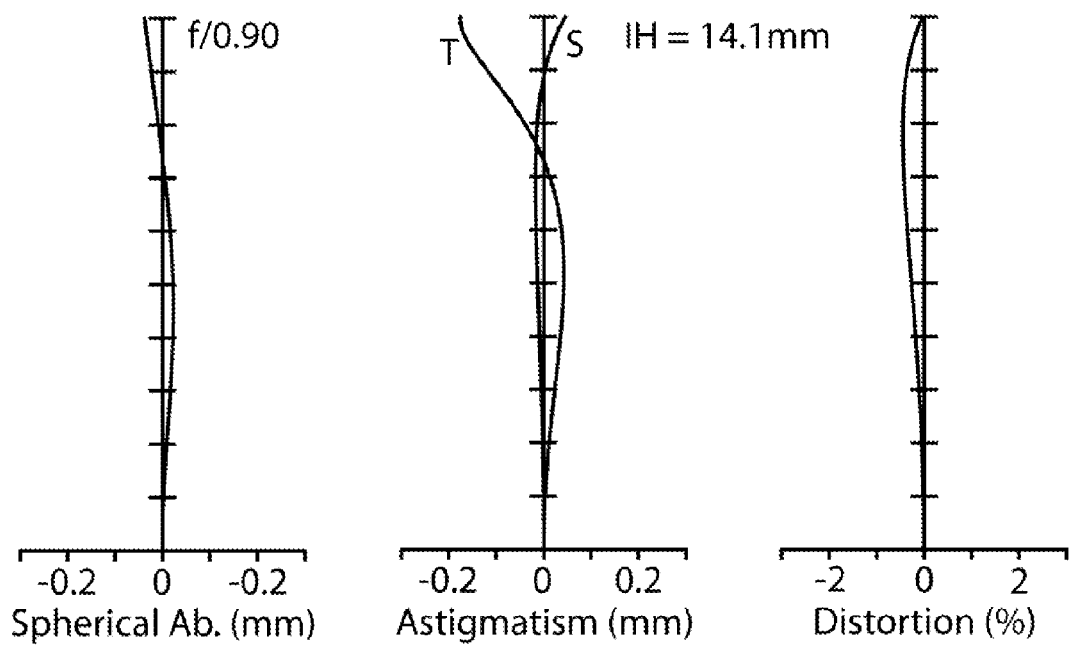
FIG. 23 is a plot of longitudinal spherical aberration in millimeters for Example #6.
FIG. 24 is a plot of longitudinal astigmatism in millimeters for Example #6.
FIG. 25 is a plot of distortion in percent for Example #6.

FIG. 23 is a plot of longitudinal spherical aberration as a function of pupil coordinate for Example 6. This plot indicates a high degree of on-axis correction at an extremely large aperture of f/0.90. FIG. 24 is a plot of longitudinal astigmatism as a function of image height, and it indicates that Example 6 has a very flat image field. FIG. 25 is a plot of distortion as a function of image height, and it indicates excellent distortion correction.

Example 6 has a magnification of 0.71×, which means that it reduces the focal length by a factor of 0.71 and it also reduces aperture ratio of the objective lens by one full stop. The image circle of the objective lens is also reduced by a factor of 0.71, which means that in order to take full advantage of the 28.2 mm diameter image circle capacity of Example 6 the objective lens must have an image circle diameter of at least 28.2/0.71=39.72 mm.

Detailed prescription data for Example 6 is given in Table 6a below. Specification data for Example 6 is given in Table 6b below. Asphere data is given in Table 6c below.

TABLE 6a

Prescription Data for Example 6

| SURF# | TYPE | R | T | GLASS | DIA |
|---|---|---|---|---|---|
| OBJ | | INF | INF | | |
| STO | PAR | INF | 30 | | |
| 2 | SPH | −65.000 | 1.500 | S-LAL8 | 32.000 |
| 3 | SPH | −93.942 | 0.250 | | 32.000 |
| 4 | ASPH | 22.044 | 5.670 | S-LAH58 | 27.200 |
| 6 | SPH | 224.841 | 1.000 | S-TIH1 | 27.200 |

TABLE 6a-continued

Prescription Data for Example 6

| SURF# | TYPE | R | T | GLASS | DIA |
|---|---|---|---|---|---|
| 7 | SPH | 17.180 | 4.661 | | 24.000 |
| 8 | SPH | 65.581 | 3.200 | S-LAL8 | 25.000 |
| 9 | SPH | −280.220 | 13.000 | | 25.000 |
| IMG | FLT | INF | | | 28.200 |

TABLE 6b

Specification Data for Example 6
EXAMPLE 6 - SPECIFICATIONS

| Focal Length | 86.1 mm |
|---|---|
| Magnification | 0.71x |
| Aperture Ratio | f/0.90 |
| Image Diagonal | 28.2 mm |
| CvOb2 | 0.04536 |
| CvIm3 | 0.05821 |
| Q1 | 8.92 |
| VT | 16.28 |
| Q2 | 0.19 |

TABLE 6c

Aspheric Coefficients for Example 6
EXAMPLE 6 - ASPHERE DATA

| Surface # | 4 |
|---|---|
| R | 22.044 |
| k | 0.000 |
| C4 | −1.5826e−6 |
| C6 | 2.9605e−9 |
| C8 | −1.7179e−11 |
| C10 | 0.000 |

TABLE 7

Index and Dispersion Values for the Glasses

| GLASS | MANUFACTURER | INDEX, $n_d$ | DISPERSION, $v_d$ |
|---|---|---|---|
| S-FSL5 | Ohara | 1.48749 | 70.24 |
| S-NSL36 | Ohara | 1.51742 | 52.43 |
| S-TIL1 | Ohara | 1.54814 | 29.52 |
| S-BAL14 | Ohara | 1.56883 | 56.36 |
| S-LAL8 | Ohara | 1.71300 | 53.87 |
| S-TIH1 | Ohara | 1.71736 | 29.52 |
| S-LAL18 | Ohara | 1.72916 | 54.68 |
| S-LAH66 | Ohara | 1.77250 | 49.60 |
| S-LAH65 | Ohara | 1.80400 | 46.57 |
| S-LAH55 | Ohara | 1.83481 | 42.71 |
| S-LAH58 | Ohara | 1.88300 | 40.77 |

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents.

What is claimed is:

1. A focal reducing attachment for use with an objective lens and consisting of in order from an object side to an image side:
a first lens element having a first negative power and an object-side concave surface;
a second lens element having a first positive power and an object-side surface having a curvature CvOb2;
a third lens element having a second negative power greater than the first negative power and having an image-side surface having a curvature CvIm3;
a fourth lens element having a second positive power and an image-side surface; and
wherein the focal reducing attachment has an overall power φ such that (CvOb2+CvIm3)/φ>3 and an overall magnification M such that 0.5≤M≤1.

2. A focal reducing attachment according to claim 1, in which the combined focal reducing attachment and objective lens defines an f-number of 0.68 or greater.

3. A focal reducing attachment according to claim 2, further comprising either undercorrected or overcorrected spherical aberration of up to 2 waves.

4. A focal reducing attachment according to claim 1, wherein the magnification M satisfies 0.65≤M≤0.85.

5. A focal reducing attachment according to claim 1, where the fourth lens element has an image-side surface that is either plano or convex.

6. A focal reducing attachment according to claim 1, wherein VT is a vertex distance from the object-side surface of the first lens element to the image-side surface of the fourth lens element, and wherein 0.05≤VT·φ<0.4.

7. A focal reducing attachment according to claim 6, wherein 0.1≤VT·φ<0.25.

8. A focal reducing attachment according to claim 1, in which objective lens has a first vertex length, the combination of the focal reducing attachment and the objective lens defines a second vertex length, and wherein the second vertex length is shorter than the first vertex length.

9. A focal reducing attachment according to claim 1, wherein the objective lens is configured as a 35 mm single-lens-reflex (SLR) lens, wherein the focal reducing attachment object side is configured to mount to the 35 mm SLR lens and the image side is configured to mount to a mirrorless camera.

10. A camera system, comprising:
the focal reducing attachment according to claim 1;
a mirrorless camera having a camera body; and
wherein the focal reducing lens is operably disposed between the objective lens and the camera body.

11. A lens system comprising:
the focal reducing attachment of claim 1;
the objective lens operably attached to the focal reducer.

12. A camera system, comprising:
the lens system of claim 11;
a mirrorless camera having a camera body with a mounting flange, wherein the lens system is operably attached to the camera body at the mounting flange.

13. A focal reducing attachment for use with an objective lens and a mirrorless camera having an image sensor arranged at an image plane, the focal reducing attachment consisting of, in order from an object side to an image side:
a first lens element having a first negative power and an object-side concave surface;
a second lens element having a first positive power and an object-side surface having a curvature CvOb2;
a third lens element having a second negative power greater than the first negative power and having an image-side surface having a curvature CvIm3;
a fourth lens element having a second positive power and an image-side surface; and
wherein the focal reducing attachment has i) an overall power φ such that (CvOb2+CvIm3)/φ>3, ii) and an overall magnification M such that 0.5≤M≤1, and ii) is corrected to account for the presence of one or more plane parallel plates that reside within the mirrorless camera and immediately adjacent the image sensor.

14. A lens system, comprising:
the focal reducing attachment of claim 13;
the objective lens operably attached to the focal reducer.

15. A camera system, comprising:
the focal-reducing attachment of claim 14;
the mirrorless camera wherein the mirrorless camera includes a camera body having an interior in which the one or more parallel plates are disposed.

16. A focal reducing attachment for use with an objective lens and consisting of, in order from an object side to an image side:
a first lens element having a first negative power and an object-side concave surface;
a second lens element having a first positive power and an object-side surface having a curvature CvOb2;
a third lens element having a second negative power greater than the first negative power and having an image-side surface having a curvature CvIm3;
a fourth lens element having a second positive power and an image-side surface;
one or more plane parallel plates that reside between the image sensor and the fourth lens element; and
wherein the focal reducing attachment has an overall power $\phi$ such that $(CvOb2+CvIm3)/\phi > 3$ and an overall magnification M such that $0.5 \leq M \leq 1$.

17. The focal reducing attachment according to claim 16, wherein at least one of the one or more plane parallel plates comprises a filter.

* * * * *